US011651602B1

(12) United States Patent
Tschernezki et al.

(10) Patent No.: US 11,651,602 B1
(45) Date of Patent: May 16, 2023

(54) MACHINE LEARNING CLASSIFICATION BASED ON SEPARATE PROCESSING OF MULTIPLE VIEWS

(71) Applicant: X Development LLC, Mountain View, CA (US)

(72) Inventors: Vadim Tschernezki, Schönefeld (DE); Lance Co Ting Keh, Mountain View, CA (US); Hongxu Ma, Mountain View, CA (US); Allen Richard Zhao, Mountain View, CA (US); Jie Jacquot, San Carlos, CA (US)

(73) Assignee: X Development LLC, Mountain View, CA (US)

( * ) Notice: Subject to any disclaimer, the term of this patent is extended or adjusted under 35 U.S.C. 154(b) by 264 days.

(21) Appl. No.: 17/060,002

(22) Filed: Sep. 30, 2020

(51) Int. Cl.
*G06V 20/64* (2022.01)
*G06K 9/62* (2022.01)
*G06N 3/08* (2023.01)
*G06N 20/00* (2019.01)

(52) U.S. Cl.
CPC ............ *G06V 20/64* (2022.01); *G06K 9/627* (2013.01); *G06K 9/6256* (2013.01); *G06N 3/08* (2013.01); *G06N 20/00* (2019.01)

(58) Field of Classification Search
CPC ...... G06V 20/64; G06K 9/6256; G06K 9/627; G06N 3/08; G06N 20/00
See application file for complete search history.

(56) References Cited

U.S. PATENT DOCUMENTS

| 5,040,229 | A | 8/1991 | Lee |
| 5,835,633 | A | 11/1998 | Fujisaki et al. |
| 7,840,071 | B2 | 11/2010 | Tang |
| 8,164,673 | B2 | 4/2012 | Horie |
| 8,284,991 | B2 | 10/2012 | Tojo et al. |

(Continued)

FOREIGN PATENT DOCUMENTS

| AU | 2014292179 | 12/2015 |
| CN | 102289673 | 12/2011 |

(Continued)

OTHER PUBLICATIONS

Wilson Castro ,"Classification of Cape Gooseberry Fruit According to Its Level of Ripeness Using Machine Learning Techniques and Different Color Spaces," Mar. 4, 2019, IEEE Access, vol. 7,2019, pp. 27389-27398.*

(Continued)

*Primary Examiner* — Omar S Ismail
(74) *Attorney, Agent, or Firm* — Kilpatrick Townsend & Stockton LLP

(57) ABSTRACT

Methods, systems, and apparatuses, including computer programs encoded on a computer storage medium, for machine learning classification based on separate processing of multiple views. In some implementations, a system obtains image data for multiple images showing different views of an object. A machine learning model is used to generate a separate output based on each the multiple images individually. The outputs for the respective images are combined to generate a combined output. A predicted characteristic of the object is determined based on the combined output. An indication of the predicted characteristic of the object is provided.

20 Claims, 4 Drawing Sheets

(56) References Cited

U.S. PATENT DOCUMENTS

| | | | |
|---|---|---|---|
| 8,406,469 | B2 | 3/2013 | Fisher |
| 8,860,942 | B1 | 10/2014 | Ewing et al. |
| 9,107,624 | B2 | 8/2015 | Darty |
| 9,251,431 | B2* | 2/2016 | Doepke ............... G06V 30/414 |
| 9,268,110 | B2 | 2/2016 | Bueler et al. |
| 9,945,721 | B2* | 4/2018 | Abolbashari ........... G01J 3/021 |
| 10,452,924 | B2* | 10/2019 | Adato ................. G06Q 10/087 |
| 10,453,197 | B1 | 10/2019 | Cholakkal et al. |
| 10,810,723 | B2 | 10/2020 | Onoro-Rubio et al. |
| 2008/0118106 | A1 | 5/2008 | Kilambi et al. |
| 2016/0358027 | A1 | 12/2016 | Hotta et al. |
| 2017/0147905 | A1 | 5/2017 | Huang et al. |
| 2017/0316285 | A1 | 11/2017 | Ahmed et al. |
| 2017/0352275 | A1* | 12/2017 | Maruyama ............. G08G 1/166 |
| 2018/0047208 | A1* | 2/2018 | Marin .................. G06T 11/001 |
| 2018/0137644 | A1* | 5/2018 | Rad ..................... G06V 10/255 |
| 2018/0284273 | A1 | 10/2018 | Buettgen et al. |
| 2019/0065880 | A1 | 2/2019 | Loginov |
| 2019/0139193 | A1 | 5/2019 | Navarrete |
| 2019/0205643 | A1 | 7/2019 | Liu et al. |

FOREIGN PATENT DOCUMENTS

| | | |
|---|---|---|
| CN | 103942562 | 7/2014 |
| CN | 104077613 | 10/2014 |
| CN | 104732240 | 6/2015 |
| CN | 105528589 | 4/2016 |
| CN | 108921822 | 11/2018 |
| CN | 110084311 | 8/2019 |
| CN | 108052984 B | 11/2019 |
| CN | 110647793 | 1/2020 |
| EP | 2208974 | 7/2010 |
| EP | 3567518 | 11/2019 |
| WO | WO 2007/098123 | 8/2007 |
| WO | WO 2016/095117 | 6/2016 |
| WO | WO 2017/223206 | 12/2017 |
| WO | WO 2018/141429 | 8/2018 |
| WO | WO 2018/187632 | 10/2018 |
| WO | WO 2019/084854 | 5/2019 |

OTHER PUBLICATIONS

Nicolai Hani,"Apple Counting using Convolutional Neural Networks," Jan. 6, 2019,2018 IEEE/RSJ International Conference on Intelligent Robots and Systems (IROS) Madrid, Spain, Oct. 1-5, 2018,pp. 2559-2564.*

Innocent Nyalala,"Tomato volume and mass estimation using computer vision and machine learning algorithms: Cherry tomato model," Jul. 14, 2019, Journal of Food Engineering 263 (2019),https://doi.org/10.1016/j.jfoodeng.2019.07.012,pp. 288-295.*

Michael Halstead,"Fruit Quantity and Ripeness Estimation Using a Robotic Vision System," Jul. 5, 2018,IEEE Robotics and Automation Letters, vol. 3, No. 4, Oct. 2018,pp. 2995-3000.*

Ryota Akai,"Distortion-Adaptive Grape Bunch Counting for Omnidirectional Images," 2020 25th International Conference on Pattern Recognition (ICPR) Milan, Italy, Jan. 10-15, 2021,pp. 599-604.*

Lino Antoni Giefer,"Deep Learning-Based Pose Estimation of Apples for Inspection in Logistic Centers Using Single-Perspective Imaging," Jul. 4, 2019,Processes 2019, 7, 424; doi:10.3390/pr7070424,pp. 1-8.*

Khurram Hameed,"A comprehensive review of fruit and vegetable classification techniques," Sep. 28, 2018,Image and Vision Computing 80 (2018) 24-34.*

M. Shamim Hossain,"Automatic Fruit Classification Using Deep Learning for Industrial Applications," Oct. 10, 2018,IEEE Transactions on Industrial Informatics, vol. 15, No. 2, Feb. 2019,pp. 1027-1031.*

T. Ishikawa,"Classification of Strawberry Fruit Shape by Machine Learning," The International Archives of the Photogrammetry, Remote Sensing and Spatial Information Sciences, vol. XLII-2, 2018 ISPRS TC II Mid-term Symposium "Towards Photogrammetry 2020", Jun. 4-7, 2018, Riva del Garda, Italy,pp. 463-467.* ai.googleblog.com [online], "MobileNetV2: The Next Generation of On-Device Computer Vision Networks," Apr. 3, 2018, retrieved on Mar. 22, 2021, retrieved from URL<https://ai.googleblog.com/2018/04/mobilenetv2-next-generation-of-on.html>, 2 pages.

Akai et al., "Distortion-Adaptive Grape Bunch Counting for Omnidirectional Images," CoRR, Aug. 2020, arxiv.org/pdf/2008.12511v1, 8 pages.

analyticsvidhya.com [online], "It's a Record-Breaking Crowd! A Must-Read Tutorial to Build your First Crowd Counting Model using Deep Learning," Feb. 18, 2019, retrieved on Mar. 22, 2021, retrieved from URL<https://www.analyticsvidhya.com/blog/2019/02/building-crowd-counting-model-python/>, 48 pages.

Annibale et al., "Optical measurement of focal offset in tunable lenses," Opt. Express., Jan. 2016, 24(2):1031-1036.

Barbin et al., "Near-infrared hyperspectral imaging for grading and classification of pork," Meat Science, Jul. 2011, 90:259-268.

Bargoti et al., "Deep fruit detection in orchards," 2017 IEEE International Conference on Robotics and Automation, Jun. 2017, 8 pages.

Baweja et al., "StalkNet: A Deep Learning Pipeline for High-Throughput Measurement of Plant Stalk Count and Stalk Width," Field and Service Robotics, Nov. 2017, pp. 271-284.

Chen et al., "Predicting the anthocyanin content of wine grapes by NIR hyperspectral imaging," Food Chemistry, Sep. 2014, 172:788-793.

Cohen et al., "Count-ception: Counting by Fully Convolutional Redundant Counting," Proceedings of the IEEE International Conference on Computer Vision, 2017, pp. 18-26.

Cu-Nguyen et al., "An imaging spectrometer employing tunable hyperchromatic microlenses," Light: Science & Applications, Apr. 2016, 5(e16058): 9 pages.

Cu-Nguyen et al., "Tunable hyperchromatic lens system for confocal hyperspectral sensing," Optics Express, Nov. 2013, 21(23):27611-27621.

Dahab et al., "Automated Brain Tumor Detection and Identification Using Image Processing and Probabilistic Neural Network Techniques," International Journal of Image Processing and Visual Communication, 2012, 1(2):2319-1724.

ElMasry et al., "Chemical-free assessment and mapping of major constituents in beef using hyperspectral imaging," Journal of Food Engineering, Feb. 2013, 117:235-246.

Gao et al., "Counting Dense Objects in Remote Sensing Images," CoRR, Feb. 2020, arxiv.org/abs/2002.05928, 5 pages.

Gao et al., "Intra-Ensemble in Neural Networks," CoRR, Apr. 2019, arxiv.org/abs/1904.04466, 5 pages.

Gao et al., "PSCNet: Pyramidal Scale and Global Context Guided Network for Crowd Counting," CoRR, Dec. 2020, arxiv.org/pdf/2012.03597v, 11 pages.

Gat et al., "Imaging Spectroscopy Using Tunable Filters: A Review," SPIE, Apr. 2000, 4056:50-64.

Godi et al., "SIMCO: SIMilarity-based object Counting," CoRR, Oct. 2020, arxiv.org/pdf/1904.07092v2, 6 pages.

Goel et al., "Low-Power Object Counting with Hierarchical Neural Networks," CoRR, Jul. 2020, arxiv.org/pdf/2007.01369v1, 6 pages.

Guan et al., "Understanding the Ability of Deep Neural Networks to Count Connected Components in Images," CoRR, Jan. 2021, arxiv.org/abs/2101.01386, 7 pages.

Gupta et al., "Hyperspectral Imaging Using Acoustic-Optic Tunable Filters," SPIE, Apr. 1999, 3718:512-521.

Habermann et al., "Supervised band selection in hyperspectral images using single-layer neural networks," International Journal of Remote Sensing, Dec. 2018, 40(10):1-27.

Halstead et al., "Fruit Quantity and Quality Estimation using a Robotic Vision System," CoRR, Jan. 2018, arxiv.org/abs/1801.05560, 8 pages.

Hani et al., "Apple Counting using Convolutional Neural Networks," 2018 IEEE/RSJ International Conference on Intelligent Robots and Systems, Oct. 2018, 8 pages.

Iwai et al., "Speeded-Up Focus Control of Electrically Tunable Lens by Sparse Optimization," Scientific Reports, 2019, 9(12365):1-6.

(56) References Cited

OTHER PUBLICATIONS

Jia et al., "Chromatic aberrations correction for imaging spectrometer based on acousto-optic tunable filter with two transducers," Optics Express, Oct. 2017, 25(20):23809-23825.

Kamruzzaman et al., "Non-destructive prediction and visualization of chemical composition in lamb meat using NIR hyperspectral imaging and multivariate regression," Innovative Food Science and Emerging Technologies, Jun. 2012, 16:218-226.

Kasmani et al., "A-CCNN: adaptive ccnn for density estimation and crowd counting," CoRR, Apr. 2018, arxiv.org/abs/1804.06958, 5 pages.

Koirala et al., "Deep learning for real-time fruit detection and orchard fruit load estimation: benchmarking of 'MangoYOLO,'" Precision Agriculture, Feb. 2019, 20:1107-1135.

Lempitsky et al., "Learning To Count Objects in Images," Advances in neural information processing systems, 2010, 23:1324-32.

Liu et al., "Robust Fruit Counting: Combining Deep Learning, Tracking, and Structure from Motion," 2018 IEEE/RSJ International Conference on Intelligent Robots and Systems, Oct. 2018, 8 pages.

Machinelearningmastery.com [online], "How to Configure Image Data Augmentation in Keras," Apr. 12, 2019, retrieved on Jun. 29, 2020, retrieved from URL https://machinelearningmastery.com/how-to-configure-image-data-augmentation-when-training-deep-learning-neural-networks/, 16 pages.

Marsden et al., "People, Penguins and Petri Dishes: Adapting Object Counting Models To New Visual Domains And Object Types Without Forgetting." CoRR, Nov. 2017, arxiv.org/pdf/1711.05586v1, 10 pages.

mathworks.com [online], "resnet101," Oct. 24, 2018, retrieved on Mar. 22, 2021, retrieved from URL<https://www.mathworks.com/help/deeplearning/ref/resnet101.html>, 3 pages.

Mcgregor et al., "Adaptive hyperspectral imager: design, modeling, and control," Journal of Optics, 2015, 17(8):11 pages.

Mikami et al., "DeepCounter: Using Deep Learning to Count Garbage Bags," 2018 IEEE 24th International Conference on Embedded and Real-Time Computing Systems and Applications, Jan. 2019, 10 pages.

Millian et al., "Dynamic compensation of chromatic aberration in a programmable diffractive lens," Optics Express, Jul. 2006, 14(20):9103-9112.

Nesteruk et al., "Image Augmentation for Multitask Few-Shot Learning: Agricultural Domain Use-Case," CoRR, Feb. 2021, arxiv.org/abs/2102.12295, 12 pages.

Noroozi et al., "Representation Learning by Learning to Count," Proceedings of the IEEE International Conference on Computer Vision, 2017, pp. 5898-5906.

pytorch.org/hub/pytorch_vision_mobilenet [online], "Mobilenet V2," Jul. 22, 2019, retrieved on Mar. 22, 2021, retrieved from URL<https://pytorch.org/hub/pytorch_vision_mobilenet_v2/>, 4 pages.

Rahnemoonfar et al., "Deep Count: Fruit Counting Based on Deep Simulated Learning," Sensors, Apr. 2017, 17(4):905.

researchgate.net [online], "How to count objects on the image with deep learning algorithms?," Apr. 30, 2020, retrieved on Mar. 22, 2021, retrieved from URL<https://www.researchgate.net/post/How-to-count-objects-on-the-image-with-deep-learning-algorithms>, 8 pages.

Sam et al., "Switching Convolutional Neural Network for Crowd Counting," 2017 IEEE Conference on Computer Vision and Pattern Recognition, 11 pages.

Santos de Arruda et al., "Counting and Locating High-Density Objects Using Convolutional Neural Network," CoRR, Feb. 2021, arxiv.org/abs/2102.04366, 15 pages.

Segui et al., "Learning to Count With Deep Object Features," Proceedings of the IEEE Conference on Computer Vision and Pattern Recognition, 2015, pp. 90-96.

Shang et al., "End-to-end crowd counting via joint learning local and global count," 2016 IEEE International Conference on Image Processing, Sep. 2016, pp. 1215-1219.

Shen et al., "Liquid crystal integrated metalens with tunable chromatic aberration," Advanced Photonics, 2020, 2(3):1-7.

softwaremill.com [online], "Counting Objects with Faster R-CNN," Jun. 2, 2017, retrieved on Mar. 22, 2021, retrieved from URL<https://softwaremill.com/counting-objects-with-faster-rcnn/>, 20 pages.

Sokhandan et al., "A Few-Shot Sequential Approach for Object Counting," CoRR, Jul. 2020, arxiv.org/pdf/2007.01899v2, 19 pages.

stackoverflow.com [online], "Tensorflow Count Objects in Image," Feb. 21, 2017, retrieved on Mar. 22, 2021, retrieved from URL<https://stackoverflow.com/questions/42375680/tensorflow-count-objects-in-image>, 2 pages.

Stein et al., "Image Based Mango Fruit Detection, Localization and Yield Estimation Using Multiple View Geometry," Sensors, Nov. 2016, 16(11):1915.

Suzuki et al., "Estimation of Chemical Composition of Grass in Meadows using Hyperspectral Imaging," Environ, Control Biol., 2008, 46(2): 129-137.

Takahashi et al., "A Novel Weight-Shared Multi-Stage CNN for Scale Robustness," IEEE Transactions on Circuits and Systems for Video Technology, Apr. 2019, 29(4):1090-1101.

Tan et al., "Cells Counting with Convolutional Neural Network," Intelligent Computing Methodologies, Jul. 2018, pp. 102-111.

Towardsdatascience.com [online], "Objects Counting by Estimating a Density Map With Convolutional Neural Networks," Sep. 27, 2019, retrieved on Mar. 22, 2021, retrieved from URL<https://towardsdatascience.com/objects-counting-by-estimating-a-density-map-with-convolutional-neural-networks-c01086f3b3ec>, 12 pages.

Towardsdatascience.com [online], "R-CNN, Fast R-CNN, Faster R-CNN, YOLO—Object Detection Algorithms," Jul. 9, 2018, retrieved on Mar. 22, 2021, retrieved from URL<https://towardsdatascience.com/r-cnn-fast-r-cnn-faster-r-cnn-yolo-object-detection-algorithms-36d53571365e>, 11 pages.

Towardsdatascience.com [online], "Segmenting, localizing and counting object instances in an image," Oct. 26, 2017, retrieved on Mar. 22, 2021, retrieved from URL<https://towardsdatascience.com/segmenting-localizing-and-counting-object-instances-in-an-image-878805fef7fc>, 12 pages.

Walach et al., "Learning to Count with CNN Boosting," Computer Vision, Sep. 2016, pp. 660-676.

Wang et al., "Correcting Axial Chromatic Aberration in a Fixed Focal Plane, Near-infrared Imaging System," CSBE/SCGAB 2006 Annual Conference, Jul. 16-19, 2006, 14 pages.

Xu et al., "Dilated-Scale-Aware Attention ConvNet For Multi-Class Object Counting," CoRR, Dec. 2020, arxiv.org/abs/2012.08149, 7 pages.

Yang et al., "Reverse Perspective Network for Perspective-Aware Object Counting," Proceedings of the IEEE/CVF Conference on Computer Vision and Pattern Recognition, 2020, pp. 4374-4383.

Zhan et al., "A new hyperspectral band selection approach based on convolutional neural network," 2017 IEEE International Geoscience and Remote Sensing Symposium, Jul. 23-28, 2017, pp. 3660-3663.

Zhang et al., "Cross-Scene Crowd Counting via Deep Convolutional Neural Networks," Proceedings of the IEEE Conference on Computer Vision and Pattern Recognition, 2015, pp. 833-841.

Zhao et al., "Chromatic aberrations correction for imaging spectrometer based on acousto-optic tunable filter with two transducers," Optics Express, Oct. 2017, 25(20):23809-23825.

\* cited by examiner

MACHINE LEARNING CLASSIFICATION BASED ON SEPARATE PROCESSING OF MULTIPLE VIEWS

TECHNICAL FIELD

This specification generally relates to image processing and classification, and more particularly to methods and systems for object classification using multiple images showing different views of the same object.

BACKGROUND

Automated classification of objects depicted within images and videos has important real life applications. For example, in agriculture, classifying the ripeness or condition of fruits can greatly improve efficiency. For example, it would be desirable for an automated system to be able to analyze images of fruits in the fields and predicting the harvest time, or to analyze harvested fruit and automatically classify the fruit for sorting and quality control. In another example, the healthcare industry would benefit from tools to identify and classify abnormalities by analyzing medical reports such as X-ray and CT scans of the human body. In many scenarios, due to the complexity of observable features in an image, manual method of classification of objects in an image performed by humans is either a time consuming process or simply not accurate enough.

SUMMARY

In some implementations, a computer system can perform classification of an object by using a machine learning model to individually evaluate images showing different views or portions of an object. For example, the system can combine the results of separately evaluating images of different sides of an object, and then use the combined result to determine a classification for the object as a whole. In some implementations, the system uses a shared set of machine learning model parameters, e.g., node weights of a neural network, to process the image data for each view or side of the object. Outputs of the machine learning model for the respective views, e.g., an output vector for each view of the object, can be summed or otherwise combined, allowing the analysis for each view or side of the object to contribute to the overall result. In this scheme, the machine learning model only receives partial information for each processing iteration, e.g., only a view of one side of the object, and does not retain or use information about other sides of the object. Nevertheless, the classification can often be highly accurate and can be faster and use a smaller, less-computationally demanding model than one that would need to process multiple views together Combining the model results for different views can act as a voting mechanism that allows the classification for each view to influence the final classification or analysis result. In many cases, the technique of a model processing a single view at a time can provide accuracy as high as models that process data for multiple sides together, while providing higher efficiency and performance that is more robust to variation in the input data.

As an example, the system may be configured to classify an object using images of multiple views or sides of the object, but with a model that evaluates only a single view at a time. The system may obtain one or more images showing different views of an object, such as a front side and back side of the object, or an image from a right-side perspective and an image from a left-side perspective. The system can process the images separately, for example, using a machine learning model to generate an output for each image individually. The model can be trained to provide output predicting the classification for the object as a whole based on input of only a single view of the object. Thus, the outputs of the model for different views can provide different classification predictions for the state or condition of the object as a whole. Each model output is generated based on a different view or portion of the object, independent of the image data for the other views, even though the characteristics or state to be predicted may not be visible from the current view being provided. In this manner, the model has been trained to account for likelihoods of conditions that may not be apparent or discernible from the data being provided to the model. The system can combine the model outputs for the different image sections, then use the combined result to classify the image. For example, each model output may be an output vector indicating a probability distribution over multiple classes. The output vectors can be summed or otherwise combined to incorporate the predictions made from the different image section analysis.

To facilitate the analysis, a machine learning model can be trained to predict a classification for an object as a whole based on input of only a view of only a single side or portion of an object, even though the other sides or portions of the object are relevant to the classification and may indicate a different classification from what would appear in the single side or portion being used. This can be done using training examples that each include (1) a single view of an object, and (2) a target output (e.g., ground truth label) representing the actual classification for the object as a whole (e.g., not merely from the characteristics shown in the current view of the object). For example, for classification of a fruit such as a strawberry, a model can be trained to predict the condition of the strawberry based on a view of only a single side of the strawberry. One object can be used to provide several training examples, with each example including a different view or side of the object. Despite the different examples containing different image content that may seem to show different conditions, the various view are assigned the same training target or ground truth label, e.g., the classification or label for the object as a whole. As a result, the training examples for the same object all share the same ground truth label for the object, even if the image content for some of the views does not correspond to that label.

Training a model in this manner can enable the model to respond strongly to features that are indicative of a particular classification, but not overly bias prediction against potential classifications when data is absent. For example, the training can help the model to moderate its predictions, so that the model does not too strongly assume that a classification is precluded when the input, which represents only partial data about an object, does not show the features of that class. The model learns, for example, that even though the current input data may not correspond to a classification, there is still a likelihood that the features indicative of a classification may be present at portions of the object not shown in the currently analyzed view. The technique can also help the model learn to give significant weight to features that, while they may be only partially shown or visible in small regions at the edges of an object, are nevertheless predictive of a particular classification of the object as a whole, since the features may simply be more extensively present at the non-visible sides of the object.

Using the analysis technique as described herein can provide an improved ability to recognize data even if part of the data is not properly recorded or is missing. For example, the present data recognition technique can be used to recognize an item depicted in an image even if part of the item is occluded, blurred, or is not recognizable from the image.

The processing techniques can provide a number of advantages. Even though the model examines only one view at a time, and thus has fewer parameters and computations that a model that assesses multiple views together, the model can provide classification accuracy that is near or even equals or surpasses a model that examines multiple view together. In addition, because the model learns to evaluate an object as a whole from a single view, the model can be more robust (e.g., more accurate in its classifications) in situations where information about an object is missing, noisy, or distorted, such as where only partial views of an object or views of not all sides are available. In addition, because the model is used to analyze only portions of a data set at a time, the number of model parameters (e.g., neural network weights) can be significantly reduced, allowing for smaller model storage size, lower memory requirements, and faster model processing. The parameters can be shared or reused for different instances of the model, and different instances of the model can process different sections of a dataset in parallel to improve overall processing speed.

The output of the machine learning model can be a set of scores indicating likelihoods for classes in a set of predetermined classes, e.g., a probability distribution over the set of classes. In particular, the score for a particular class can indicate a likelihood that the object, for which a view was provided as input, belongs to or should be classified in the particular class. The recognition technique combines the likelihood outputs determined for the various object views, and then uses the combined outputs to determine a class that represents the condition or state of the object, e.g., a selection of a class from the set of predetermined classes. The classes can be any form of information that helps recognizing and/or classifying the object depicted in the image.

In one general aspect, a method performed by one or more computers includes: obtaining, by the one or more computers, image data for multiple images of a three-dimensional object, wherein the multiple images respectively provide different views of the three-dimensional object and respectively show different portions of the three-dimensional object; using, by the one or more computers, a machine learning model to generate a separate output for each of the multiple images, wherein each of the outputs is generated using a same set of machine learning model parameters and each of the outputs is produced by processing only a single, respective one of the multiple images using the machine learning model, wherein the machine learning model is trained using training data in which at least some training images have corresponding labels that represent classifications based on features of the objects that are not visible in the training images; combining, by the one or more computers, the outputs for the respective images to generate a combined output; determining, by the one or more computers, a predicted characteristic of the three-dimensional object based on the combined output; and providing, by the one or more computers, an indication of the predicted characteristic of the three-dimensional object.

In some implementations, determining the predicted characteristic comprises selecting a classification for the object from among a predetermined set of classifications based on the combined output.

In some implementations, the predicted characteristic is a value indicative of a property of the three-dimensional object.

In some implementations, the multiple views are views of different sides of the three-dimensional object.

In some implementations, the predicted characteristic comprises at least one of: a state or condition of the three-dimensional object; an object type for the three-dimensional object; or a size of the three-dimensional object.

In some implementations, the machine learning model is a trained neural network that has been trained to classify an overall state of an object based on an image representing a single view of an object that shows only a portion of the object.

In some implementations, the trained neural network that has been trained using examples that include (i) first images each showing individual sides of objects and (ii) corresponding labels that represent classifications of the objects based on features of the objects that are not visible at the sides of the images shown in the first images but are visible from opposing sides of the object that are not shown the first images.

In some implementations, the set of machine learning model parameters are parameters of the trained neural network that were learned during training of the trained neural network.

In some implementations, the set of machine learning model parameters are values of weights of neurons of the trained neural network.

In some implementations, the trained neural network comprises an output layer configured to provide values that respectively correspond to different classifications in a predetermined set of classifications, wherein the values represent a probability distribution over the predetermined set of classifications.

In some implementations, the output for each of the multiple views is an output vector, and wherein combining the outputs comprises summing corresponding values of the output vectors to generate a combined output vector.

In some implementations, determining the predicted characteristic comprises selecting a classification for the three-dimensional object from among a predetermined set of classifications based on the combined output In some implementations, the predicted characteristic is a value indicative of a property of the three-dimensional object comprising at least one of (i) a state or condition of the three-dimensional object, (ii) an object type for the object and (iii) a size of the three-dimensional object and wherein the predicted characteristic is a value indicative of a property of the three-dimensional object.

In some implementations, the machine learning model is a trained neural network that has been trained to classify an object based on an image representing a single view of an object wherein the trained neural network that has been trained using examples that include images and corresponding labels that represent classifications of objects based on features of the objects that are not visible in the images.

In some implementations, the set of machine learning model parameters are parameters of the trained neural network that were learned during training of the trained neural network wherein the set of machine learning model parameters are values of weights of neurons of the trained neural network.

In some implementations, training the classification model uses images from a training set that includes images of objects from multiple views. However depending on the implementations, the classification model can be trained on multiple images of the same object where the images of the object differ in orientation, occlusion, and illumination.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims

DETAILED DESCRIPTION

Figure 1:
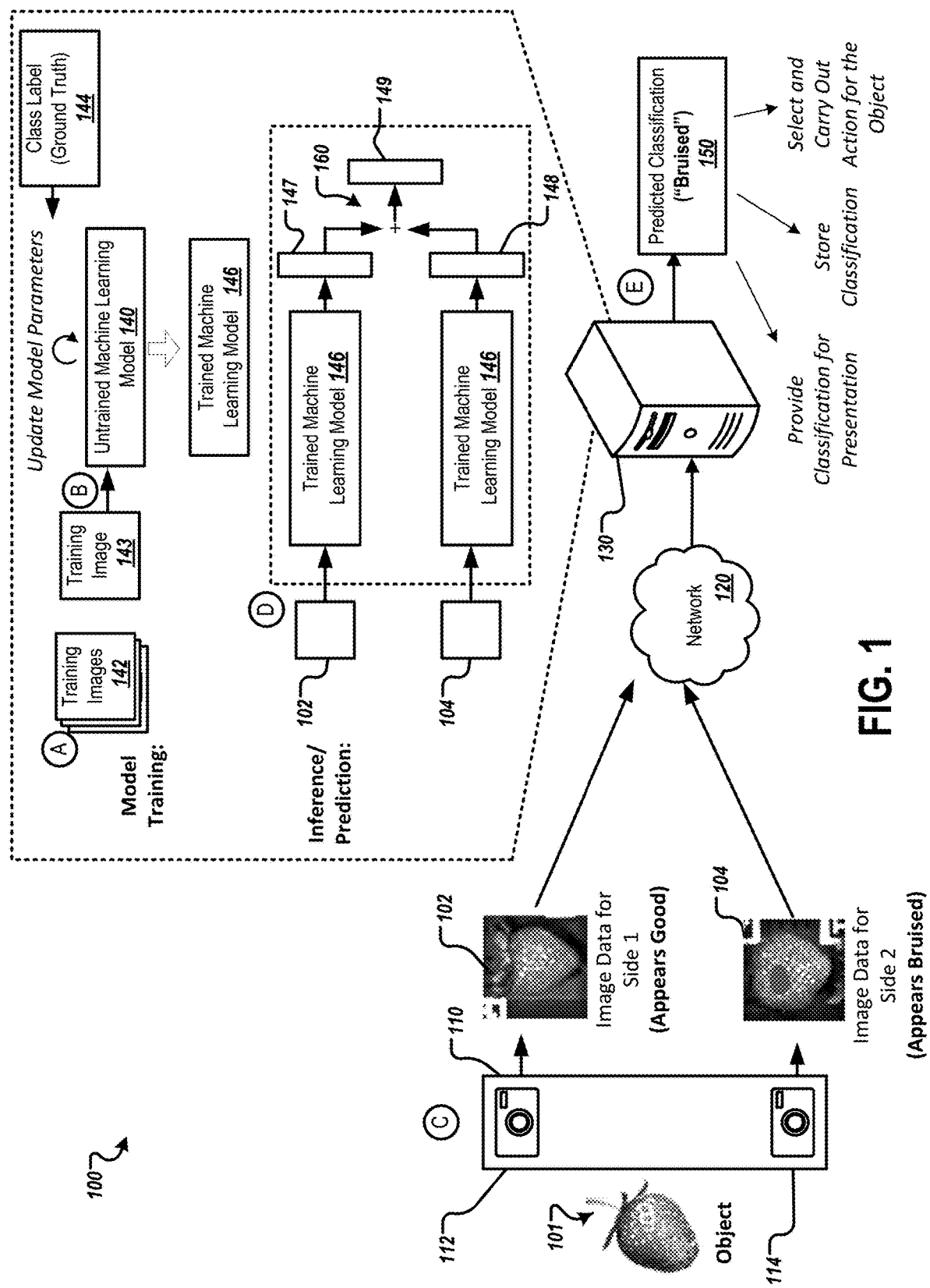
FIG. 1 is a diagram illustrating an example of a system for classifying objects.

Image processing systems and machine learning techniques can be used in many different industries and sectors, such as manufacturing, commerce, healthcare, agriculture, and security. For example, automated classification of products produced at a manufacturing facility can use cameras and machine learning models to identify defects in the products and classify items into classes such as "good" or "defective." This ensures quality control without requiring human inspection. Another example of automated classification based on computer vision is the classification of fruit based on quality or condition before packaging the fruits in a fruit packaging facility.

The techniques discussed herein describe ways to use machine learning to more effectively evaluate the state or condition of objects based on images showing multiple views of the objects. For example, the system can obtain multiple views of an object, such as images showing different sides of the object. The system can use a machine learning model to evaluate the images separately, and then the system can combine the separately-generated machine learning results to make a prediction or inference about the object. For example, the system can predict a physical property of the object, a state or condition of the object, a classification for the object, and so on. By examining the images showing different views separately, the machine learning model can be much smaller and operate with much less computation than a model configured to simultaneously process the combined set of image data for multiple views. Even with a smaller, faster model, the results can have excellent accuracy, often as accurate or nearly as accurate as comprehensive models that process multiple views together. Further, the approach that assesses separate views can be more accurate and robust in situations where only partial image data is available, where a view of an object is partially occluded, or where only a limited amount of training data is available.

In some implementations, the current invention can be used for controlling the quality of an object, e.g., fruit, a manufactured item, etc., in connection with a packaging system. The machine learning techniques can be used to identifies objects that meet quality standards and those that do not. The system may be used to evaluate each object, e.g., each fruit to be packaged, each item manufactured, etc., which the system can then be used to sort or group items by quality or condition. In some implementations, the system can be used to assess a sampling of items, such as a certain number from each of different batches.

Various examples below describe applications to classify the condition of fruit from image data. However the techniques disclosed herein can be used to classify many different types of objects with respect to different properties of the objects.

Modern product packaging often uses conveyor belts, and classifications of items being conveyed can be used to determine actions for the packaging system to carry out. Cameras can be installed to acquire images of items conveyed on the conveyor belt, and the machine learning techniques discussed herein can evaluate different views of the items to efficiently and accurately classify items. The system can record the classifications, provide information about the classifications for display, and take other actions. For example, in some implementations, the system may use the determined classifications to physically sort objects, to direct objects to different locations, to determine whether to package an object or reject it, to assign it to different groups or areas based on size or condition, and so on.

FIG. 1 is a block diagram of an example system 100 for classifying objects. The figure shows an example that involves both training a machine learning model and using the trained machine learning model to classify objects depicted in images. The system 100 includes a camera system 110 for capturing images of objects. For example, the camera system 110 captures images of an object 101, which is a strawberry in this example, that is on a conveyor belt in a packaging facility before packaging the strawberries into boxes.

In some implementations, the camera system 110 may include multiple cameras, with each camera arranged to capture images of objects from a different perspective. As a result, the different cameras can capture views of the object 101 from different angles, poses, or orientations. For example, the camera system 110 includes two cameras 112 and 114 which takes two images 102 and 104 respectively of the object 101 from different angles, thereby capturing two different sides of the object 101. For example, the image 102 can represent an image of the right side of the object 101, and the image 104 can be an image of the left side of the object 101. Other arrangements can be used to obtain images of multiple views of an object, e.g., views of multiple sides of the object 101. For example, a single camera may be used. A image of one side of the object 101 can be captured, and then the object 101 may be moved or turned over to expose a different side of the object 101 to the camera, and a second image can be captured for this side.

The example of FIG. 1 shows two images 102, 104, with the system 100 configured to capture and process two views of each object. Nevertheless, the same techniques can be used to capture and process more than two views, e.g., 3, 4, 5 or more views of the object 101, and use machine learning analysis for each of those views to determine a classification for the object 101.

In some implementations, the camera system 110 may include cameras and lighting configured to capture images of objects in one or more spectrums of light other than the visible spectrum. For example, the camera system 110 can comprise cameras that capture hyperspectral images of strawberries. In addition to or instead of capturing traditional photographs, e.g., RGB images, image data can be captured for each of multiple different wavelength bands inside or outside the visible range. For example, hyperspectral image data can include data for various wavelength bands in the visible range as well as various wavelength bands in one or more of ranges classified as near near-infrared (NIR), short-wave infrared (SWIR), mid-wave infrared, long-wave infrared (LWIR), far infrared (FIR), near UV, middle UV, etc.

In some implementations, the cameras may generate images with different resolutions. In some implementations, the camera system 110 generates a streaming video of objects, and the images of objects can be image frames or portions of image frames selected from the video.

The system further includes a network 120. The network 120 can include a local area network (LAN), a wide area network (WAN), the Internet or a combination thereof. The network 120 can also comprise any type of wired and/or wireless network, satellite networks, cable networks, Wi-Fi networks, mobile communications networks (e.g., 3G, 4G, and so forth) or any combination thereof. The network 120 can utilize communications protocols, including packet-based and/or datagram-based protocols such as internet protocol (IP), transmission control protocol (TCP), user datagram protocol (UDP), or other types of protocols. The network 120 can further include a number of devices that facilitate network communications and/or form a hardware basis for the networks, such as switches, routers, gateways, access points, firewalls, base stations, repeaters or a combination thereof.

The system 100 also includes a computing system 130, which can include one or more computers. The computing system 130 can be local or remote with respect to the camera system 110. In some implementations, the computing system 130 is a server system that receives image data over a network, as illustrated, and provides data about classifications determined. In other implementations, some or all of the processing of the computer system 130 may be performed by a local computer, a mobile device (e.g., cellular phone, tablet computer, etc.), etc. For example, a computer or mobile device can receive a trained machine learning model 146 can use the model to process images that the mobile device captures.

The computing system 130 uses a machine learning model 146 to analyze the images 102, 104 of objects, and the computing system 130 classifies the objects (e.g., assigns class labels) based on output of the machine learning model. The set of possible classes can be determined by the designer of the system 100. The machine learning model 146 can be, for example, an artificial neural network, a support vector machine, a classifier, a regression model, a reinforcement learning model, a clustering model, a decision tree, a random forest model, a genetic algorithm, a Bayesian model, or a Gaussian mixture model. In the example of FIG. 1, the machine learning model is a neural network. Neural networks can employ one or more layers of nonlinear units (e.g., nodes or neurons) to predict an output for a received input. Neural networks typically include an input layer to receive input, one or more hidden layers comprising nodes for processing data, and an output layer that provides output of the network. The output of each hidden layer is used as an input to the next layer in the network, e.g., the next hidden layer or the output layer. Each layer of the network generates an output from a received input in accordance with the current values of a respective set of parameters. For example, the parameters can be weights for the nodes of the neural network that indicate the strengths of connections between nodes (e.g., the different degrees of effect that input from different nodes in the prior layer has on the output of the node at the current layer). The parameters can be adjusted during training, based on the examples in the training data.

To perform classification, the camera system 110 captures two or more images 102, 104 of an object 101 and transmits the images 102, 104 to the computing system 130 using the network 120. Upon receiving the two or more images taken by the camera 110, the computing system 130 processes the images 102, 104 and using the trained neural network 146. This process involves using the same trained neural network 146 (or copies of the neural network 146 having the same parameters or training state) to separately process the different images 102, 104. As discussed further below, although the trained neural network 146 receives only the image showing a portion of the object 101 (e.g., a view of one side of the object 101), the trained neural network 146 makes a prediction about the condition or classification of the object 101 as a whole, taking into account the uncertainty of the features that may be present at the side(s) that are not shown in the current image being processed. In other words, rather than predict merely the condition shown or visible in the image, the trained neural network 146 outputs a prediction based on the whole three-dimensional object. The trained neural network 146 is used to separately and independently assess each image 102, 104, each time making a prediction about the object 101 as a whole even though only partial information about the object (e.g., a single view) is considered. The results of separately processing the different views are combined and the combined results are used to select a predicted classification or other property of the object 101.

In some implementations, the components of the system 100 can be geographically distributed. In such implementations, the computing system 130 can be implemented by a single remote server or by a group of multiple different servers that are distributed locally or globally. In such implementations, the functions performed by the computing system 130 can be performed by multiple distributed computer systems and the processing using the machine learning model is provided as a software service over the network 120.

In some implementations, the system 100 can be implemented locally. For example, the system 100 can be implemented as a standalone unit that houses the camera system 110 and the computing system 130.

In some implementations, the system 100 can be implemented using a user device that comprises a camera, such as a mobile phone, tablet computer, or laptop computer. In such implementations, the user can use the camera of the user device to capture images of an object from multiple perspectives to obtain multiple views (e.g., different sides of the object). In some implementations, the machine learning model can be implemented within (e.g., stored on and processed by) the user device. In other implementations, the machine learning model can be implemented on a remote server. Upon taking multiple images of a strawberry using the user device, such as smartphone, the user can send the images over the network 120 by uploading it to the remote server. Upon receiving the images, the remote server evaluates the images to generate the predicted class of the strawberries. The predicted class is then sent to the user device via the network 120 for display.

FIG. 1 further illustrates an example flow of data, shown in stages (A) to (E). Stages (A) to (E) may occur in the illustrated sequence, or they may occur in a sequence that is different than in the illustrated sequence. In some implementations, one or more of the stages (A) to (E) may occur offline, where the computing system 120 may perform computations when the user device is not connected to the network 130.

During stage (A), the computing system 130 obtains a set of training images 142. The set of training images 142 includes images for multiple different objects, for example, many different instances of strawberries. For each of the objects of a same type (e.g., for each strawberry of multiple strawberries), there can be multiple training images 142, for example, images depicting different views of the object. In particular, the multiple views can show different sides of the object or reveal different portions of the object. The training data can also include class labels for the images to indicate the ground truth or true class to which the objects belong. For categorizing strawberries, for example, the class label may be one selected from among a list of classes, such as good, unripe, bruised, mildewed, and decayed.

In some implementations, two or more images in the set of training images 142 corresponds to the same physical object, with the two or more images being taken from different angles, e.g., corresponding to the different sides of the object. For example, the set of training images 142 may include two images where the first image depicts one side of a particular strawberry and the second image shows the other side of the same strawberry. Note that this technique can effectively increase the amount of training data available when limited examples are present. In other words, for a single object, images of the two sides provide two training examples based on the single object. Similarly, images from three sides of an object can provide the data for three training iterations based on a single object.

In some implementations, the training images show distinct portions of an object, so that the portions shown in different images do not overlap. In other implementations, the training images may show at least partially overlapping portions of an object. For example, five different images of a single strawberry may be generated, each showing a different view of the strawberry from a position around the fruit.

In the illustrated example, the set of training images 142 includes images of multiple different strawberries of varying sizes, shapes, conditions, and so on, to give examples of the various different classes that the system 100 should be able to detect. For each of the strawberries there are multiple images showing different views of the strawberry and also a label indicating the true class or true condition of the strawberry. Importantly, the class label for an image indicates the actual condition of the strawberry as a whole, not merely what is evident from the portion of the strawberry pictured in the image. For example, a bruised strawberry may appear to be in good condition from one side, but appear bruised on the opposite side. In this case, images of the two sides would both be labeled as representing the bruised condition, even though one of the images shows what appears to be a good strawberry. This is somewhat counterintuitive, because conventional machine learning systems typically align labels and training targets with the visible or apparent features that the model receives as input, to avoid confusing a model. In this case, however, by basing the class label on the sometimes non-apparent actual condition of the object as a whole, there are instances where the class labels are deliberately assigned to a classification contrary to what the image shows. This helps the training process develop the machine learning model to better deal with the uncertainty of processing individual images that each show only a portion (e.g., one side) of an object. In the aggregate, through training over many different examples, the model learns to make predictions that reflect the uncertainty that aspects of the classification are not available in the current input set. As a result, the model can moderate its confidence level that a certain class is appropriate, since the training data has shown that there are situations in which an object that appears strongly to be in one class based on the current image may nevertheless be in a different class based on portions of the object that are not shown in the currently processed image. This also helps improve robustness in the event that part of the object is occluded in an image.

In some implementations, the images used for training may include traditional images (e.g., RGB photographs), multispectral images, hyperspectral images, X-ray images, or magnetic resonance imaging (MRI) images. In some implementations, the two or more images for each object used for training may further comprise images with different resolutions, noise levels, sharpness, or other properties.

During stage (B), the computing system 130 uses the set of training images 142 to train the machine learning model 140. During the training process, the parameters of the machine learning model 140 are adjusted so that the machine learning model 140 learns to predict the appropriate classes for the objects shown in input images provided to the machine learning model 140. For example, in a training iteration the class label for an image, representing the actual condition of the object as a whole, can be used as a training target for that training iteration. The model resulting from the training is shown as trained neural network 146. Depending on the implementation, the training process of the machine learning model 140 can be supervised, unsupervised, or semi-supervised. The parameters of the machine learning model 140 may be adjusted automatically by the computing system 130. The training process is described in more detail below with respect to FIG. 2.

During the training process, images from the set of training images 142 are individually provided as input to the machine learning model 140, e.g., with one image 143 for each training iteration. The model is incrementally trained using an appropriate training technique, such as through backpropagation of error for a neural network model. Other training algorithms that can be used include gradient descent, stochastic gradient descent, Newton's method, quasi-Newton's method, conjugate gradient method, the Levernberg-Marquardt algorithm. For example, if the output that the model 140 generates in response to an image does not indicate that the correct class is the same class indicated by the class label 144, the parameters of the model 140 can be updated to increase the likelihood of the correct class for the input features provided. Similarly, even if the correct class was indicated to be most likely, the parameters can be adjusted in training to adjust the relative likelihood of the correct class compared to the others. The parameters (e.g., node weights) of one or more hidden layers of a neural network may be adjusted so that the trained neural network produces output vector indicating class likelihoods that corresponding to each training images 142.

In some implementations, the machine learning model 140 may include one or more convolutional neural network (CNN) layers. For example, the first layer or first processing layer of a neural network model can be a CNN layer. The model 140 can also include one or more fully-connected or "deep" neural network layers as hidden layers. Other types of layers, such as locally-connected or partially-connected layers can be used. The training typically adjusts the parameter values for the model 140, without adjusting the structure or topology of the model 140, and so the trained model 146 includes the same layers as the model 140 before training.

The training process can be used to train the model 140 to predict a condition, state, or physical property of an object. For example, the model 140 can be trained to infer, from a single image, which class is appropriate for an object, from among different classes that represent different conditions, states, or physical properties. In the example, the model is trained assess images of individual strawberries, and to predict the relative probability that the depicted strawberry is in a class from among a predetermined set representing different conditions, such as good, unripe, bruised, mildewed, and decayed. As another example, the model 140 may be trained to perform a regression task, such as to assign a value to the ripeness of a strawberry from an image, such as along a scale from 0 (e.g., representing fully green) to 10 (e.g., representing fully ripe). The training process can use many images of the same type of object, e.g., images of different strawberries. In some implementations, the model 140 is additionally trained to identify or distinguish the type of object depicted, such as to recognize whether a strawberry is present or whether a cherry is present, as well as to predict or infer the condition of the object.

With the trained machine learning model 146 available, the model 146 can then be used to predict the characteristics or classes of objects from images, discussed in stages (C) to (E).

During stage (C), the camera 110 captures two or more images 102, 104 of the object 101. The two or more images of the object 101 each depict a different view (e.g., show a different side or perspective) of the object 101. In some implementations, the images captured by the camera system 110 are RGB images. In other implementations, the images captured by the camera system 110 may be hyperspectral images. For example, the camera system 110 captures two images 102 and 104 of the object 101 depicting the front and back of the strawberry respectively. The image data for the images 102, 104 is provided to the computing system 130 over the network 120.

During stage (D), the computing system 130 uses the trained machine learning model 146 to analyze the received images 102, 104 in order to predict or infer characteristics of the object 101 depicted in the images 102, 104. The model 146 was trained to analyze individual views of objects, separately and independently. In generating a prediction for the object 101, the computer system 130 also processes each image 102, 104 individually.

The computer system 130 provides the first image 102 as input to the model 146 and obtains an output, such as an output vector 147. The computer system 130 provides the second image 104 as input to the model 146 and obtains an output, such as an output vector 148. The input to the model 146 can be pixel data, such as an array or vector of intensity values for each of one or more colors (e.g., RGB intensity values or monochrome intensity values) or one or more spectral bands. The output vectors 147, 148 can indicate the relative probability for each of multiple different classes. For example, there may be five predetermined classes that the model is configured to assess, and each output vector 147, 148 can include a probability distribution over the five predetermined classes (e.g., each output vector includes five probability scores, one for each class). As a result, each output vector 147, 148 can indicate the relative likelihoods for the classes that the model 146 predicts for the object 101.

In generating the outputs for the different images 102, 104, the same model parameter values or model training state can be used. For example, a single instance of the model 146 can be used to produce the output vectors 147, 148 one at a time. As another example, two instances of the model 146 can be used, where the parameter values are shared between the two instances. In this case, the two instances of the model 146 can be used in parallel, to concurrently determine the output predictions for the object 101 determined from different images.

The computing system 130 then combines the output vectors 147, 148 with a summation 160 or other operation to generate a combined vector 149. For example, the probability distributions generated based on the different images 102, 104 can be added together. In effect, this provides a type of a voting mechanism that allows the result determined from each different view to equally influence the final classification or analysis result of the computing system 130. The computing system 130 uses the combined vector 149 to determine a class that represents the condition or characteristics of the object 101 (e.g., not just that the object is a strawberry, but a classification of the condition or quality of strawberry). For example, the computing system 130 may identify the score in the combined vector 149 that indicates the highest likelihood and can select the class corresponding to that score.

In the illustrated example, the first image 102 shows no defects in the object 101 on the side shown. As a result, the model 146 provides the output vector 147 to indicate that the most likely classification for the object is "good," e.g., ripe and undamaged. Although this is the most likely condition given the image 102, the model 146 was trained with class labels indicating that even a strawberry looking good on one side may in fact be bruised, mildewed, or otherwise damaged in an area not visible. After all, a strawberry is good only if both sides are undamaged, while a strawberry that is bruised or moldy on only one side is still bruised or moldy overall. As a result, the probability scores in the output vector 147 may indicate that the likelihood of the strawberry being good is 40% while the likelihood of each of the other four classes is around 15% each. This avoids the model 146 from being overly certain about predictions of some classifications, such as whether an object is in good condition, when only partial information is assessed.

If the image 104 of the other side of the strawberry appeared to be good also, then the model 146 would provide an output vector 148 would also indicate that "good" class is most probable, and so the combined vector 149 would also indicate that "good" is the appropriate class. However, in the illustrated example, the image 104 of the strawberry shows a bruise, and so the output vector 148 provides a high likelihood, e.g., 80%, that the "bruised" class is appropriate. In this case, the occurrence of a bruise on only one side or only one portion of the strawberry leads to a "bruised" class for the strawberry as a whole. Accordingly, the training of the model 146 allows the probability score for the "bruised" class to dominate the probability distribution (e.g., at 80%) of the output vector 148 much more than the probability score for the "good" class did (e.g., at 40%) for the output vector 147. In the combined vector 149, formed by summing of the output vectors 147, 148, the total probability for the "bruised" class exceeds the total probability for the other classes, and so the computer system 130 selects "bruised" as the condition for the object 101.

In stage (E), the computing system 130 provides the output classification selected for the object 101. For example, the computing system 130 can provide an indication of the classification for display on a screen, send the classification to another device or system (such as a user's phone or computer) for presentation, store the classification in association with the images 102, 104 and/or an identifier for the object 101 (e.g., a bar code, RFID tag code, serial number, etc.), and so on. In some implementations, if the prediction meets certain criteria, e.g., if a particular classification is determined or a score for the object 101 satisfies a threshold or range, then the computing system 130 can cause an alert or notification to be provided to a user's device.

The computing system 130 can additionally or alternatively take one of various different actions that may be dependent on the classification determined. For example, if the classification is "good," the strawberry can be conveyed to an area or into a container to be packaged for retail sale. If the classification is "bruised," the strawberry can be conveyed to different area for a different kind of processing or to remove it for quality control. If the classification is "mildewed" or "decayed" the strawberry can be discarded. Based on the classification, the computer system 130 or another system can generate control instructions and provide the instructions to a conveyor belt or other machinery, causing the object 101 to be sorted, packaged, transported, cleaned, altered, or otherwise acted on. The computing system 130 can have rules or a lookup table or other logic that can be used to determine the appropriate action(s) to perform in response to the prediction of different classifications.

In the example of FIG. 1, for simplicity in illustration, the same computer system 130 (1) performs the training to obtain the trained machine learning model 146 and (2) uses the trained machine learning model 146 to process image data. In many implementations, these operations may be performed by different computer systems or devices. For example, a first computer system may generate and train a machine learning model, then provide the trained machine learning model to a second computer system that uses the received model to process images and determine classifications for objects.

Although the example of FIG. 1 and other examples herein discuss application of the technique to classification, the same techniques can be used for regression tasks. For example, rather than choosing a discrete category representing a property or condition of the object 101, the model 146 can be one that is trained to give a score for a characteristic. The combined output can be total score or averaged score for the characteristic, as a composite of scores determined for different views. In other words, rather than classifying a strawberry as simply ripe or unripe, the model 146 may assign a score for ripeness from 0 to 10, low ripeness to high ripeness. The predicted scores for two different view may indicate scores of 2 and 8 respectively, which can be averaged in the combined score to an overall ripeness score of 5. Note that in this case, the training of the model 146 would use, as the training targets, the actual ripeness scores assigned to the object depicted in the training images, even if the scores are inconsistent with the visible features in individual views of the object, just as the actual overall classification for an object is the training target for all views of the object in training in the example above.

Figure 2:
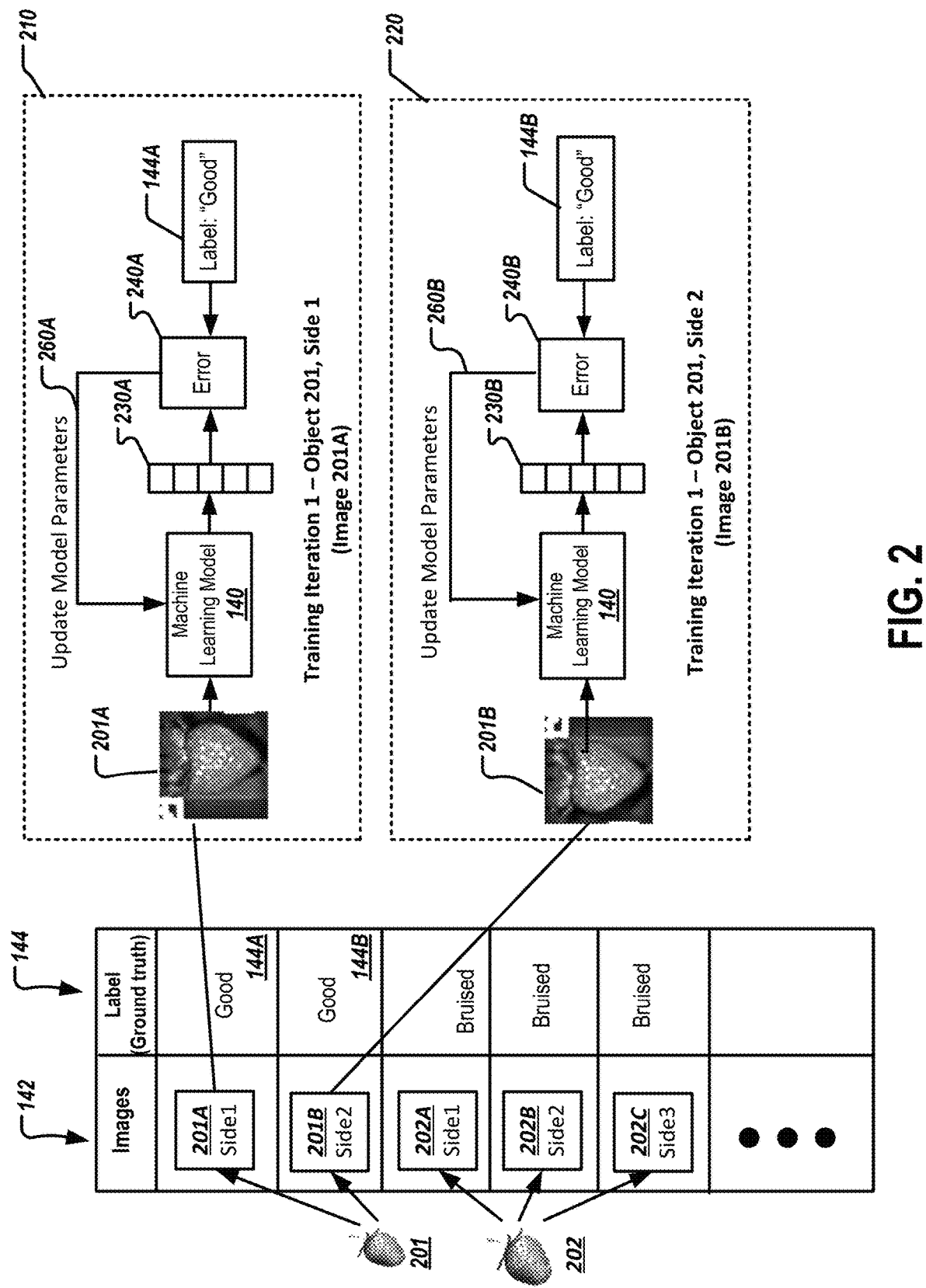
FIG. 2 is a diagram illustrating an example of training a machine learning model.

FIG. 2 is a block diagram illustrating an example of training the machine learning model 140. The example shows the set of training images 142 and two iterations or instances of training cycles for training the machine learning model 140. These training iterations are represented as elements 210 and 220 respectively. As mentioned above, the set of training images 142 can include multiple images of each of multiple objects. For each image, a class label 144, indicating the ground truth or true class to which the object depicted in the image belongs.

Also as mentioned above, the training images 142 can include multiple images of the same object, captured from different views of the object. For example, the image 201A and the image 201B are two images of the strawberry 201, representing the front side and back side of the strawberry 201. The images 201A and 201B provide two different examples in the set of training images 142 which are used separately, in different training iterations 210, 220 to train the model 140. The true class for the strawberry 201 is "good," and so the ground truth labels 144A, 144B for the images 201A, 201B are both "good." As another example, images 202A, 202B, and 202C are three images depicting three sides of the strawberry 202. Each image 202A, 202B and 202C provides a different example in the set of training images 142, even though they depict the same strawberry 202. The true class of the strawberry 202 is "bruised," and so the class label for all images 202A-202C of this strawberry 202 is "bruised," even if some sides of the strawberry 202 appear to be in good condition.

Training the machine learning model 140 can include providing an image from the set of training images 142 as input to the machine learning model 140. The machine learning model 140 processes the input image data, for example, by propagating signals through a neural network, based on the current values of the parameters of the neural network, to obtain an output vector. The computing system 130 then uses the output from the model 140 and the class label to determine the level of error in the prediction of the machine learning model 140. The computing system 130 then adjusts the parameters of the machine learning model 140 based on the error determined, e.g., using backpropagation to adjust parameters in a manner that would reduce the error.

For example, in the training instance 210, the image 201A is provided as input to the machine learning model 140. The machine learning model 140 processes the input image 201A and generates an output vector 230A. In some implementations, the output vector 230A can be the output of a softmax layer, which provides as output a probability distribution of the input representing an object in one of the classes for which the machine learning model 140 is trained. For example, the output vector 230A has five values where each value is the predicted probability of the strawberry depicted in image 201A belongs to one of the five classes "good", "decayed", "unripe", "bruised" and "mildewed" respectively. Based on the output vector 230A and the class it indicates to be most likely, the computing system 130 updates the parameters (e.g., values for node weights) of the model 140. For example, the predicted class is compared with the true class 144A to generate the error signal 240A, which is used to adjust the parameters of the machine learning model 140, shown through the feedback signal 260A.

The training instance 220 similarly further trains the model 140 using the input image 201B depicting the back side of the strawberry 202. The image 201B is processed by the machine learning model 140 to generate the output vector 230B of the strawberry. The output vector 230B and the predicted class indicated most likely are compared to the true class 144B of the strawberry to generate an error signal 240B, and the parameters of the machine learning model 140 are adjusted using the feedback 260B.

In some implementations, the system performs data augmentation to expand the set of training data available. For example, transformations can be applied to images, e.g., rotations, translations, noise added, filters applied, contrast or brightness adjusted, and other changes made. While the technique already provides good robustness to different image characteristics, these transformed image examples can further provide additional benefits in robustness and accuracy of the models.

As discussed above, some classifications for the condition of an object are capable of being determined with high confidence with a single view, while other classifications may be determined with high confidence only with agreement across outputs for multiple views. For example, the classification of an object as being new, or undamaged, or in good condition may be difficult to determine from a single view of an object. On the other hand, the classification of an object as cracked or damaged may be able to be determined with high confidence from a single view that shows a crack or instance of damage. The training of the machine learning model 140, by using training targets representing the overall status or condition of the object (and not merely what is visible from the current view), helps train the model 140 to provide probability distributions that reflect this reality. In other words, the model 140 is trained so that, when indicating a preference for a class or property that requires consistency or consensus across multiple views to be correct, the probability distribution signals the preference for that class only weakly, even when the image data is a direct match for that class. As a result, consensus across the outputs for different views may be needed in order for that class to be the most likely in the combined output. On the other hand, for a class in which observation of certain features in a single view is dispositive, the model 140 is trained to strongly or conclusively signal the preference for that class, enabling the output distribution to signal greater confidence and for the probability of that class to overpower other classes in the combined output, even if other output distributions prefer a different more weakly signaled class.

In some implementations, the techniques discussed herein for separate processing of multiple views are used to best effect with objects of a type that exhibit a general symmetry in shape. Examples include objects that have bilateral symmetry (e.g., reflection or "mirror image" symmetry), such as symmetry about a line or plane. Another example includes objects that have rotational or axial symmetry. For example, images of a strawberry from different sides or at different rotational positions show different surfaces of the strawberry but the same general shape and type of material, which simplifies the task of the neural network.

Figure 3:
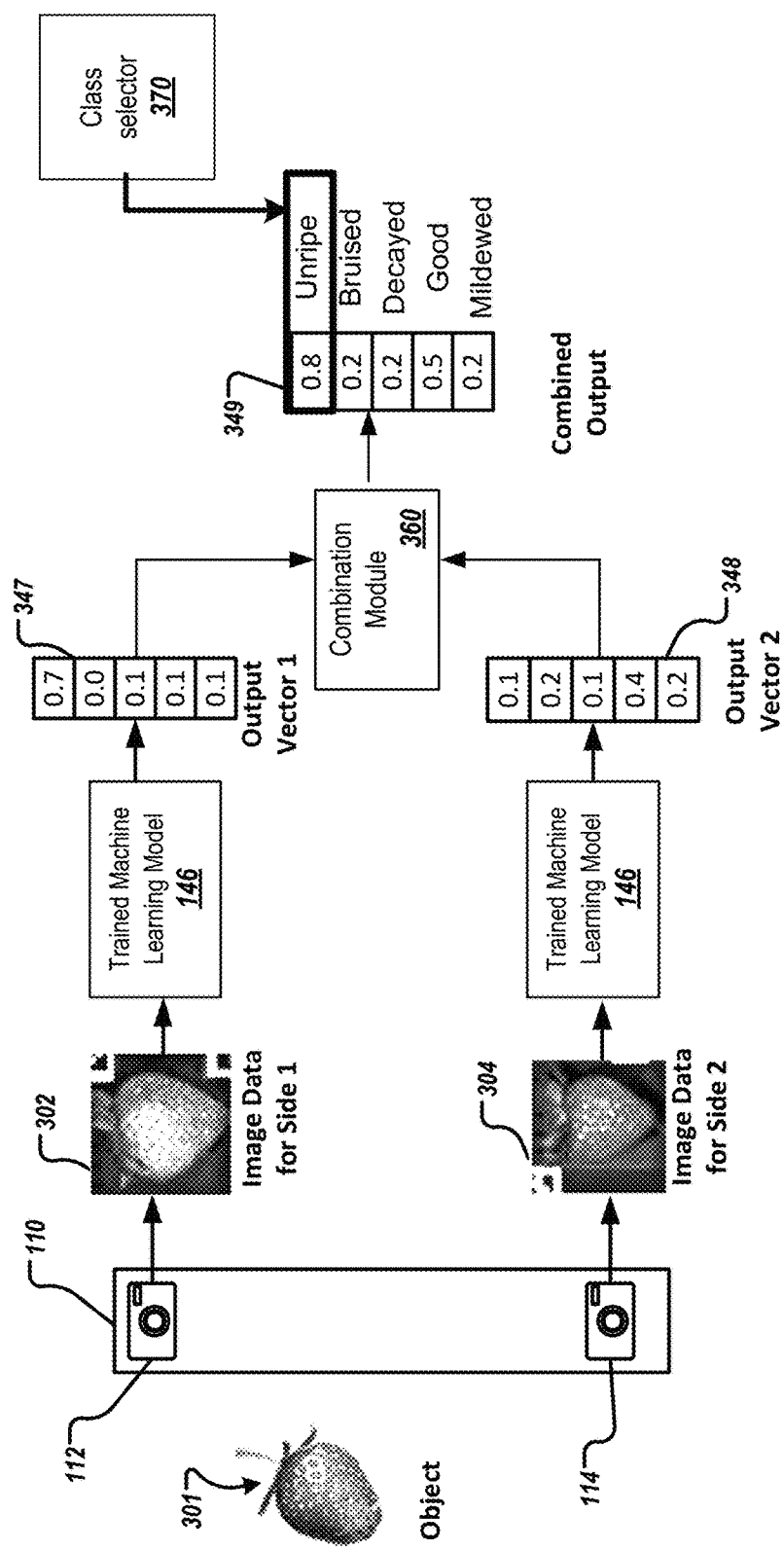
FIG. 3 is a diagram illustrating an example of using a machine learning model to generate a prediction.

FIG. 3 is a block diagram illustrating using the machine learning model 146 to generate a prediction. This example provides further detail regarding the operations of stage (D) shown in FIG. 1. As mentioned before, the machine learning model 146 receives individual images and processes them separately and independently. For the classification of an object 301, the system can process images that represent different views, e.g., different sides or portions, of the object 301 to be classified. For example, the camera system 110 captures two images 302 and 304 of the object 301. The image 302 depicts the front side of the object 301 and the image 304 depicts the back side of the object 304.

Each image is processed separately by the machine learning model 346 to generate a corresponding output vector. For example, the trained neural network 146 receives the image 302 of the object, processes the image 302 and generates an output vector 347 in response. Similarly the trained neural network 146 receives the image 304 of the object, processes the image 304 and generates an output vector 348 in response.

The model 146 can be trained to receive any of various different types of image data or data derived from image data. For example, rather than receive image data for a monochrome, visible-light image or RGB data for an image, the model 146 can receive and process hyperspectral image data. As a result, the model 146 may be configured to process data for spectral bands outside the visible range, in addition to or instead of processing visible image data. Similarly, the model 146 may be configured to process image data for 5, 10, 15, or more different spectral bands. In some cases, the model 146 may be configured to process combinations of different spectral bands. For example, if image data is captured for spectral bands A through E, the data input to the model may be (1) an image representing the sum of intensity data for bands A and B, (2) an image representing the difference between the intensity data for bands C and D, (3) an image representing the combination of bands A through C minus the combination of bands D and E, and so on.

In some implementations, the output vectors 347 and 348 may each represent a different probability distribution for the object 301 over all classes for which the neural network 146 was trained. For example, the output vector 347 includes five values where each value is the predicted probability that the object 301 belongs to one of the five classes "good", "decayed", "unripe", "bruised" and "unripe." The output vector 348 also includes five values where each value is the predicted probability that the object 301 belongs to one of the five classes. In some implementations, the output of the model 146 may additionally or alternatively be a score, ranking or a confidence measure that represents the predicted class of the object.

The two output vectors 347, 348 (or as many output vectors as there are different image views processed) are provided to a combination module 360, which combines the information from the different outputs of the model 146 based on different views to generate a combined output vector 349. One manner of combining the output vectors 347, 348 is to sum them. Other functions of the two output vectors 347, 348 can be used. As another example, a maximum function can be applied to select the maximum value for each class, across the different output vectors 347, 348 (e.g., keeping the highest of the scores for the "good" class, the highest of the scores for the "unripe" class, and so on).

In some implementations, the combination module 360 may generate the combined output vector 349 using another machine learning model trained for this purpose. For example, a further machine learning model can receive as input the output vectors of the model 146 and then provide an output vector based on it. In general, the combined output vector may be generated using any linear or non-linear combination of the output vectors 347, 348 of the machine learning model 146.

Based on the combined vector 349, the computer system 130 selects the class indicated to be most likely as the classification for the object 301. The computer system 130 can include a class selector module 370 that examines the combined vector 349 and selects a classification based on it.

In the example, the highest score in the combined vector 349 is the score for the "unripe" class, and so that is the class selected for the object 301.

A number of variations of the analysis techniques can be used. For example, in the example of FIG. 3, the trained machine learning model 146 is a neural network having a softmax layer, so that the output vectors 347, 348 are probability distributions over a set of classes, which are then combined into the combined vector, which is another probability distribution over the set of classes. The softmax function takes as input a vector of real numbers, e.g., logits, and normalizes the vector into a probability distribution. Rather than combining probability distributions output from the softmax layer of the model 146, the system may instead combine the logits that would have been the inputs to the softmax layer. For example, the vectors 347, 348 may be the respective sets of logits that are determined prior to the softmax layer. The vectors 347, 348 including the logits may then be combined (e.g., summed, maximum values taken, or otherwise combined), and then the combined logits can be provided to the softmax layer to generate the output scores 349. Thus, the system can be configured to sum the logits of model 146 determined for different views, and then transform the summed logits to probabilities by applying a softmax layer or function. More generally, the vectors 347, 348 that are determined from the machine learning model 146 may represent values or other data derived from a hidden layer of the model 146, which can be combined and then processed further, either by remaining layers of the model 146 or potentially another trained machine learning model.

In some cases, the combination module 360 can include another trained machine learning model that is trained for the purpose of combining the results of machine learning model outputs for different views. For example, whether the output vectors 347, 348 represent softmax outputs, logits, values derived from a hidden layer of the model 146 (e.g., a measure of activations at a same, predetermined hidden layer, such as the second-to-last layer), or other values, the combination module 360 can include a softmax layer or a more complex neural network to receive the combined values and provide a set of scores, such as a probability distribution. This softmax layer or other network can be trained using combinations of outputs for multiple views and labels indicating the ground truth of the corresponding object. This can be helpful to train the combination module 360 to recognize, for example, that a high likelihood of certain conditions, such as decay, mildew, or bruising, should have a high influence on the output if present for even just one image of the object, even if the views from other sides indicate good condition. As noted above, the combination module 360 can include any type of function of the vectors 347, 348, where the vectors 347, 348 are determined from processing different views with the same shared weights or parameters of the model 146.

The example of FIG. 3 shows two views of the object 301 being processed and combined, but the system, with a model 146 trained as described herein, can also be used on only a single view, for example, the image of only one side of the object 301 if that is all that is available, though accuracy may be lower without information about the opposing side of the object 301. Similarly, the same techniques can be used if there are 3, 4, or more different views, with the output vectors for each of the views being combined together. The views provided by the images may show distinct non-overlapping portions of the object 301, or the views may show partially overlapping portions of the object 301.

Figure 4:
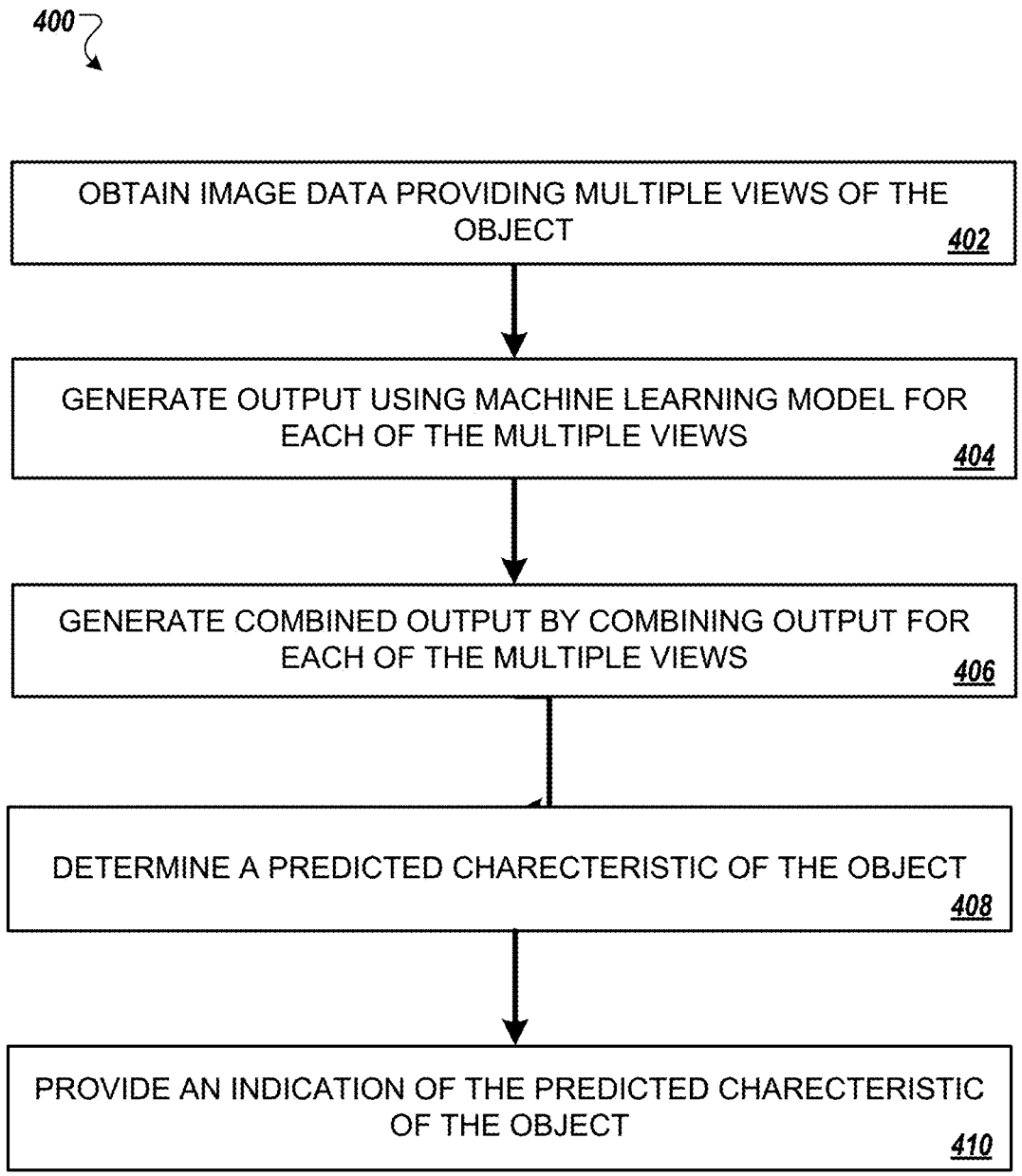
FIG. 4 is a flow diagram illustrating an example of a process for classifying objects using the machine learning model.

FIG. 4 is a flow diagram illustrating an example of a process 400 for classifying an object using a machine learning model. Briefly the process 400 includes obtaining image data providing multiple views of the object that is needed to be classified. For each of the multiple views, an output is generated using the machine learning model. A combined output is generated based on the output of each of the multiple views. A predicted characteristic is determined based on the combined output and an indication of the predicted characteristic of the object is provided.

In greater detail, image data that comprises multiple images of the object such that the multiple images have a different view of the object is obtained (402). The images obtained can have different characteristics such as resolution, color scheme and spectrum.

Each image of the object is provided as input to a machine learning model that generates a corresponding output using the same set of learned parameters (404). For example, the machine learning model 146 processes two images 102 and 104 and generates the corresponding output 147 and 148. In some implementations, the machine learning model can be a neural network. In some implementations, the output provided by the machine learning model by processing an image, is a prediction of the class of the object based on the image properties. In other implementations, the output provided by the machine learning model is an encoded representation of the image that was provided as an input.

Each of the output generated by the machine learning model for each image that represents a different view of the object is combined to generate the combined output (406). For example, the output 147 and 148 is combined to generate the combined output 149.

Based on the combined output, the predicted characteristics such as the state or condition of the object, the size of the object or the type of the object are determined (408). For example, the object 101 is classified as one of the following classes "good", "decay", "green", "bruise" and "green" based on the combined output.

After determining the predicted characteristic of the object, the predicted characteristic of the object is presented for display to the user (410). In other implementations, the predicted characteristic of the object can be stored in a storage medium or it can be used for tasks that require classification of objects.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
obtaining, by the one or more computers, image data for multiple images of a three-dimensional object, wherein the multiple images respectively provide different views of the three-dimensional object and respectively show different portions of the three-dimensional object;

using, by the one or more computers, a machine learning model to generate a separate output for each of the multiple images, wherein each of the outputs is generated using a same set of machine learning model parameters and each of the outputs is produced by processing only a single, respective one of the multiple images using the machine learning model, wherein the machine learning model was trained using training data that included:

at least some training images, wherein each of the at least some training images includes a depiction of at least one side of a corresponding object; and for each of the at least some training images, a corresponding label that represents a classification of the corresponding object based on one or more features of the corresponding object that are not visible in the training image but are visible from other another side of the corresponding object not shown in the training image;

combining, by the one or more computers, the outputs for the respective images to generate a combined output;

determining, by the one or more computers, a predicted characteristic of the three-dimensional object based on the combined output; and providing, by the one or more computers, an indication of the predicted characteristic of the three-dimensional object.

2. The method of claim 1, wherein determining the predicted characteristic comprises selecting a classification for the object from among a predetermined set of classifications based on the combined output.

3. The method of claim 1, wherein the predicted characteristic is a value indicative of a property of the three-dimensional object.

4. The method of claim 1, wherein the different views are views of different sides of the three-dimensional object.

5. The method of claim 1, wherein the predicted characteristic comprises at least one of:
a state or condition of the three-dimensional object;
an object type for the three-dimensional object; or
a size of the three-dimensional object.

6. The method of claim 1, wherein the machine learning model is a trained neural network that has been trained to classify an overall state of an object based on an image representing a single view of an object that shows only a portion of the object.

7. The method of claim 6, wherein the set of machine learning model parameters are parameters of the trained neural network that were learned during training of the trained neural network.

8. The method of claim 6, wherein the set of machine learning model parameters are values of weights of neurons of the trained neural network.

9. The method of claim 1, wherein the output for each of the multiple images is an output vector, and wherein combining the outputs comprises summing corresponding values of the output vectors to generate a combined output vector.

10. The method of claim 6, wherein the trained neural network comprises an output layer configured to provide values that respectively correspond to different classifications in a predetermined set of classifications, wherein the values represent a probability distribution over the predetermined set of classifications.

11. A system comprising:
one or more computers; and
one or more computer-readable media storing instructions that, when executed by the one or more computers, cause the one or more computers to perform operations comprising:

obtaining, by the one or more computers, image data for multiple images of a three-dimensional object, wherein the multiple images respectively provide different views of the three-dimensional object and respectively show different portions of the three-dimensional object;

using, by the one or more computers, a machine learning model to generate a separate output for each of the multiple images, wherein each of the outputs is generated using a same set of machine learning model parameters and each of the outputs is produced by processing only a single, respective one of the multiple images using the machine learning model, wherein the machine learning model was trained using training data that included:

at least some training images, wherein each of the at least some training images includes a depiction of at least one side of a corresponding object; and for each of the at least some training images, a corresponding label that represents a classification of the corresponding object based on one or more features of the corresponding object that are not visible in the training image but are visible from other another side of the corresponding object not shown in the training image;

combining, by the one or more computers, the outputs for the respective images to generate a combined output;

determining, by the one or more computers, a predicted characteristic of the three-dimensional object based on the combined output; and providing, by the one or more computers, an indication of the predicted characteristic of the three-dimensional object.

12. The system of claim 11, wherein determining the predicted characteristic comprises selecting a classification for the object from among a predetermined set of classifications based on the combined output.

13. The system of claim 11, wherein the predicted characteristic is a value indicative of a property of the three-dimensional object.

14. The system of claim 11, wherein the multiple views are views of different sides of the three-dimensional object.

15. The system of claim 11, wherein the predicted characteristic comprises at least one of:
a state or condition of the three-dimensional object;
an object type for the three-dimensional object; or
a size of the three-dimensional object.

16. The system of claim 11, wherein the machine learning model is a trained neural network that has been trained to classify an overall state of an object based on an image representing a single view of an object that shows only a portion of the object.

17. The system of claim 16, wherein the output for each of the multiple images is an output vector, and wherein combining the outputs comprises summing corresponding values of the output vectors to generate a combined output vector.

18. One or more non-transitory computer-readable media storing instructions that, when executed by one or more computers, cause the one or more computers to perform operations comprising:

obtaining, by the one or more computers, image data for multiple images of a three-dimensional object, wherein the multiple images respectively provide different views of the three-dimensional object and respectively show different portions of the three-dimensional object;

using, by the one or more computers, a machine learning model to generate a separate output for each of the multiple images, wherein each of the outputs is generated using a same set of machine learning model parameters and each of the outputs is produced by processing only a single, respective one of the multiple images using the machine learning model, wherein the machine learning model was trained using training data that included:
  at least some training images, wherein each of the at least some training images includes a depiction of at least one side of a corresponding object; and
  for each of the at least some training images, a corresponding label that represents a classification of the corresponding object based on one or more features of the corresponding object that are not visible in the training image but are visible from other another side of the corresponding object not shown in the training image;

combining, by the one or more computers, the outputs for the respective images to generate a combined output;

determining, by the one or more computers, a predicted characteristic of the three-dimensional object based on the combined output; and providing, by the one or more computers, an indication of the predicted characteristic of the three-dimensional object.

19. The one or more non-transitory computer-readable media of claim 18, wherein determining the predicted characteristic comprises selecting a classification for the object from among a predetermined set of classifications based on the combined output.

20. The one or more non-transitory computer-readable media of claim 18 wherein the predicted characteristic is a value indicative of a property of the three-dimensional object.

* * * * *